J. N. ARVIN & J. M. WHITMORE.
CORN PLANTER.
No. 82,578.                     Patented Sept. 29, 1868.
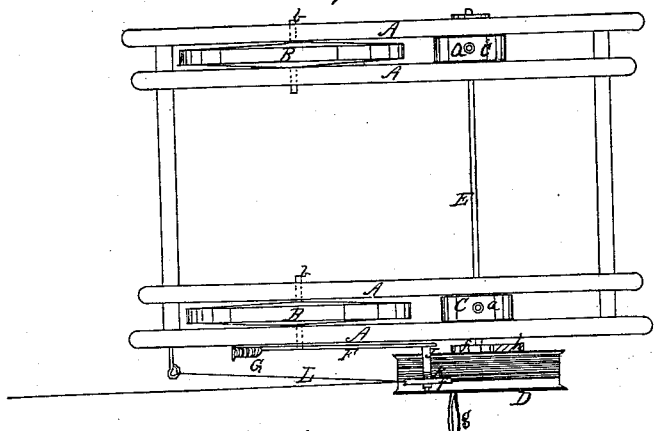
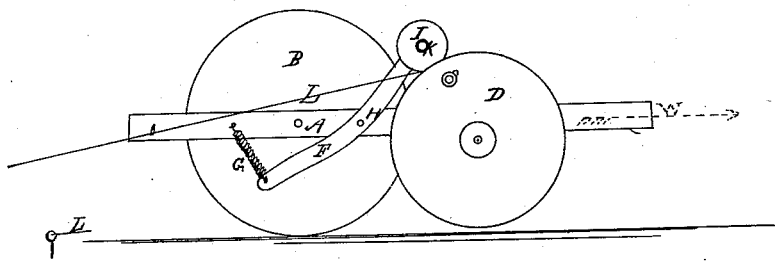

United States Patent Office.

JOHN N. ARVIN AND JOSEPH M. WHITMORE, OF VALPARAISO, INDIANA, ASSIGNORS TO THEMSELVES AND AMMI M. BENNETT, OF CHICAGO, ILLINOIS.

*Letters Patent No. 82,578, dated September 29, 1868.*

IMPROVEMENT IN CORN-PLANTER.

*The Schedule referred to in these Letters Patent and making part of the same.*

TO ALL WHOM IT MAY CONCERN:

Be it known that we, JOHN N. ARVIN and JOSEPH M. WHITMORE, of Valparaiso, in the county of Porter, in the State of Indiana, have invented an Improved Corn-Planter; and we do hereby declare that the following is a full and exact description thereof, reference being had to the accompanying drawings, and to the letters of reference marked thereon, making a part of this specification, in which—

Figure 1 is a plan view of our invention.

Figure 2, a longitudinal elevation of the same.

Figure 3, an enlarged view of the adjustable wire guide.

Figure 4, an elevation of the ratchet, which causes the drum to turn the cup-shaft when the wire is being paid out, and permits the latter to be afterwards wound upon the drum without the necessity of turning said cup-shaft.

The present invention relates to an improvement in that class of planters which have dropping-devices arranged to operate independently of the travelling-wheels, and its nature consists in the novelty of the means used to hold the check-wire on the drum, pay it out from the same, and wind it up when a row has been planted.

In order to give a correct understanding of our invention, we have marked corresponding parts with similar letters, and will now give such a detailed description as will enable others skilled in the art to make and use it.

A A represent a substantial wooden frame, with double side-pieces, supported on axles $b\ b$ and wheels B B, the latter being arranged to run between said double side-pieces, as are also the cup-wheels C C, similarly to those shown in our said patent, No. 61,981, the arrangement in this respect being a very common construction, and therefore only needs to be seen in the drawings to be fully understood. The cup-wheels C C have made in their peripheries a series of cups, $a\ a$, such a distance apart as will correspond with the width of row to be planted, and should have hoppers placed over them for holding corn, and conductors placed below them for conveying it to the ground. These parts of the planting-apparatus are not shown in the drawings, because they are no part of our invention, and because they are so simple and well known that persons having ordinary mechanical skill in this respect will readily comprehend how they are to be made, there being several kinds now in use, which can be attached to the frame without change of construction. The shaft E, supporting wheels C C, also supports a drum, D, made of wood or metal, as most convenient, and of such size as will, when turned on said shaft E, with wheels C C, cause the latter to drop the corn in check-rows of the required width. To illustrate: Suppose the wheels C C to have two cups $a$ each, and the rows are to be planted three feet apart; the drum D then should be six feet in circumference, and of such length parallel with its axis as will hold such an amount of common small wire, of sufficient strength to operate the dropping-apparatus, and yet not so heavy as to be cumbersome, as will reach the length of rows to be planted.

The device for winding and unwinding the wire evenly on the drum D consists of a lever, F, pivoted to the side of frame A, at H, and has its lower end attached to a coil-spring, G, which is fastened to frame A, the upper end of said lever supporting a short journal, J, on which is made to revolve, and to have a reciprocating motion, a wire guide-wheel, I, having such a length of hub, K, as will keep it steady on said journal, and also a groove in its periphery corresponding with the size of the wire L.

By means of this arrangement, said wire L will be wound spirally and evenly on the drum D, and without any part thereof overlapping the other. This is an important consideration; otherwise, the coils being laid over one another, would cause them to have different lengths, which would give an irregular motion to the wheels C C. The drum D is made to revolve on the shaft E when winding up the wire L, and to revolve with the same when dropping corn and said wire is being paid out. A ratchet, $f$, being attached to shaft E, and pawl $h$ to the inside of the drum D, are used to accomplish this purpose.

Operation.

The end of the wire L should be fastened to a pin or stake at the commencement of the row; after which the planter can be moved in the direction indicated by the dart W, fig. 2, and the corn will be dropped in check-rows accurately; then the wire can be loosened, and wound upon the drum D, by means of the crank $g$, not more than two minutes being required to perform the latter operation, unless the wire used is more than eighty rods in length.

Having thus described our invention, what we claim, and desire to secure by Letters Patent of the United States, is—

The combination of drum D, wire L, cup-wheels C C, lever F, spring G, adjustable wire guide I, arranged to run on journal J and ratchet $f$, constructed to operate as herein specified.

J. N. ARVIN,
J. M. WHITMORE

Witnesses:
  JAMES BELL,
  ISAAC CROSS.